Aug. 18, 1931.  J. H. CORDES  1,819,230
GAS GENERATING APPARATUS
Filed Feb. 11, 1929  5 Sheets-Sheet 2
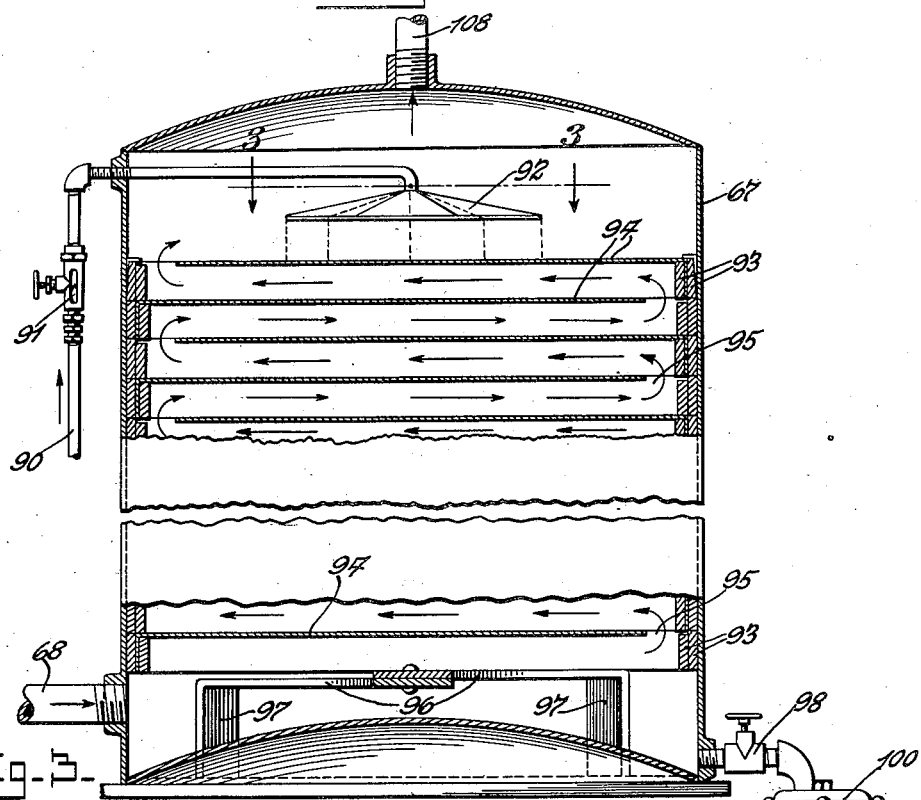
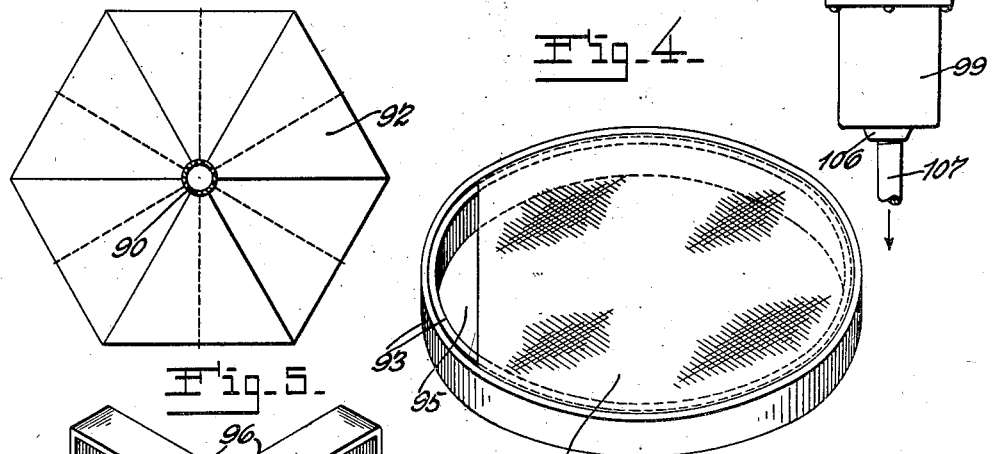
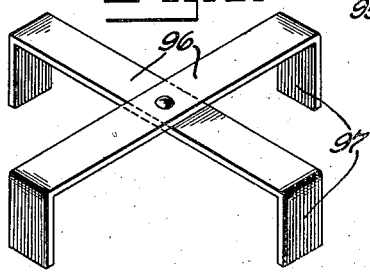
Inventor:
John H. Cordes,
by Rippey & Kingsland.
His Attorneys.

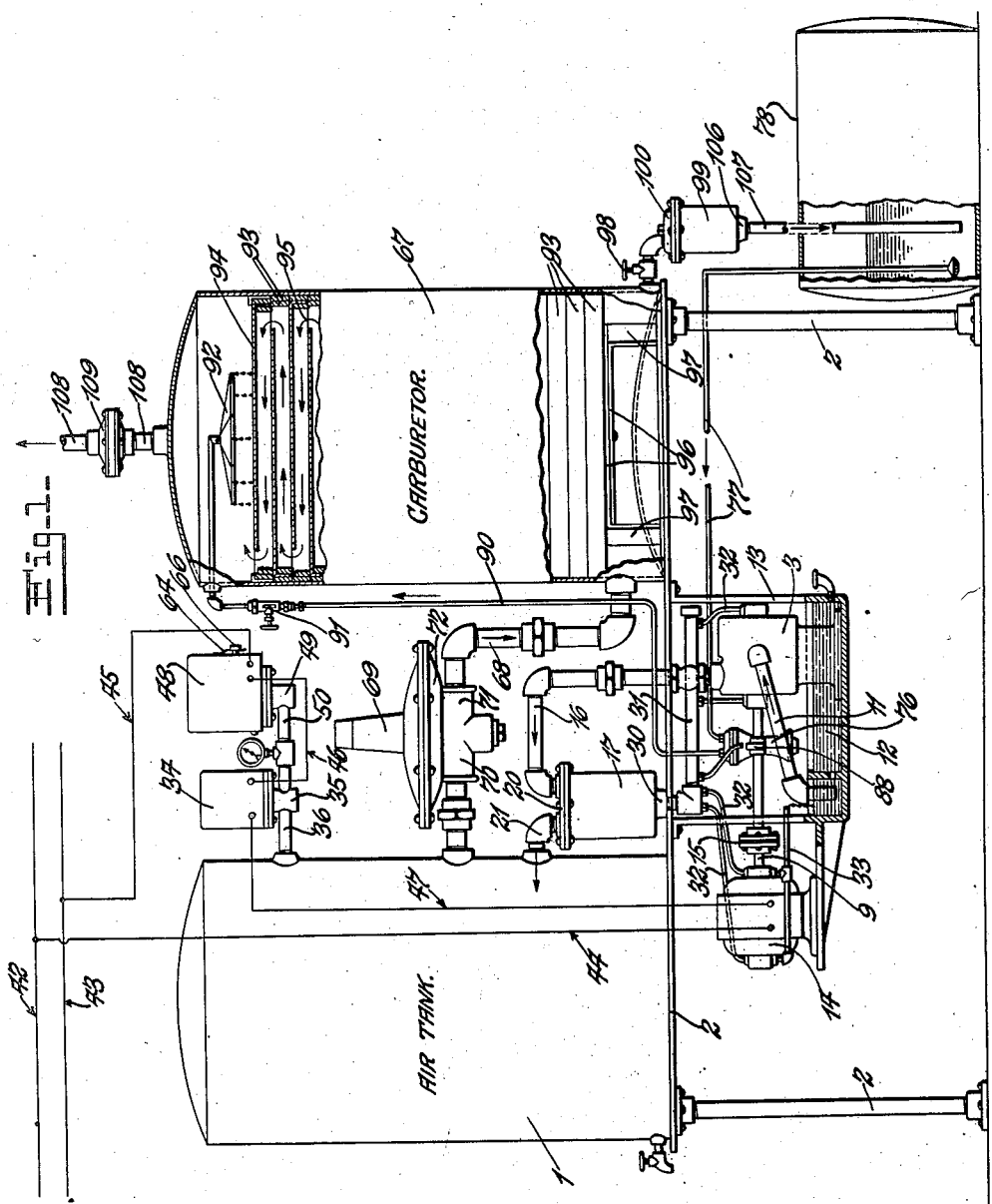

Aug. 18, 1931.  J. H. CORDES  1,819,230
GAS GENERATING APPARATUS
Filed Feb. 11, 1929     5 Sheets-Sheet 3

Inventor:
John H. Cordes,
by Rippey & Kingsland.
His Attorneys.

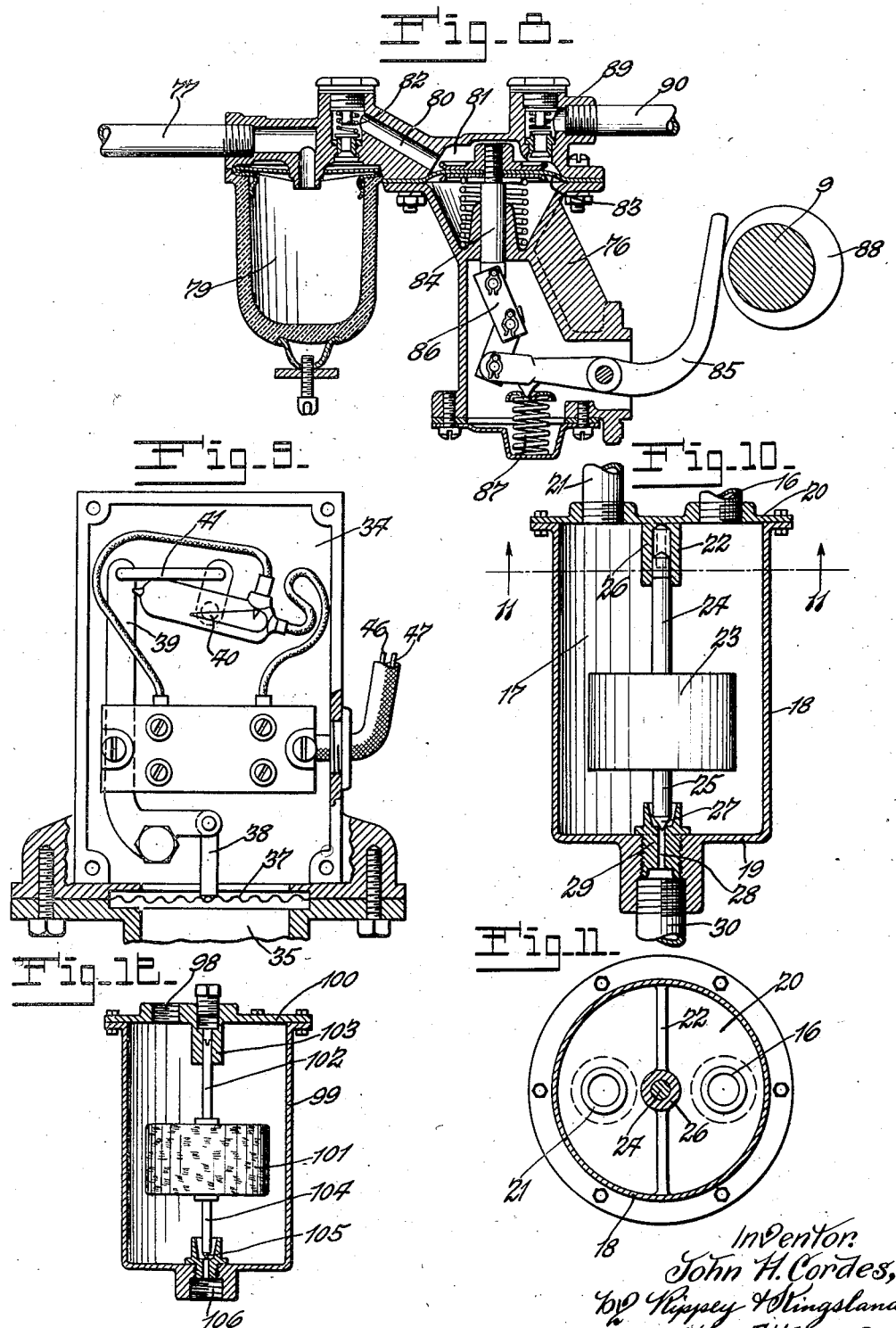

Aug. 18, 1931.  J. H. CORDES  1,819,230
GAS GENERATING APPARATUS
Filed Feb. 11, 1929    5 Sheets-Sheet 5

Inventor:
John H. Cordes,
by Rippey & Kingsland
His Attorneys.

Patented Aug. 18, 1931

1,819,230

UNITED STATES PATENT OFFICE

JOHN H. CORDES, OF ST. LOUIS, MISSOURI

GAS GENERATING APPARATUS

Application filed February 11, 1929. Serial No. 339,071.

This invention relates to improvements in gas generating apparatus and consists of the novel construction hereinafter disclosed.

An object of the invention is to provide an apparatus for generating gas by carburetting a volatile fuel evolved from a hydrocarbon liquid, such as gasoline, with provision for adjusting the relative volumes of fuel and air delivered to the carburetor or mixing chamber and to control the delivery of the respective volumes of air and fuel delivered to the carburetor incident to the pressure of the air supply.

Another object of the invention is to equip an apparatus of the class described with a safety device for preventing the delivery of air and fuel to the carburetor when the air supply falls below a predetermined pressure.

Another object of the invention is to coordinate the delivery devices for the air and fuel supply and to simplify the construction of such delivery devices.

Additional advantages of the construction will be apparent to those skilled in the art from the following description thereof taken in connection with the drawings in which—

Fig. 1 is an elevation, certain of the elements being shown in section, of the complete machine.

Fig. 2 is a view, partially in section, of the carburetor element of the system.

Fig. 3 is a detailed view of the spreader device of the carburetor.

Fig. 4 is a detailed view of one of the carburetor trays.

Fig. 5 is a detailed view of a support for the carburetor trays.

Fig. 8 is a vertical section of the pump constituting a portion of the fuel delivery system.

Fig. 9 is a detailed view, in vertical section, of the automatic circuit breaker for the motor circuit that operates the fuel pump and the air pump.

Fig. 10 is a detailed view, in vertical section, of the float controlled trap of the oil and air separation in the air line.

Fig. 11 is a cross-section on the line 11—11 of Fig. 10 of the same device.

Fig. 12 is a detailed view, in vertical section, of the overflow trap between the carburetor and the fuel supply tank.

Figure 13:
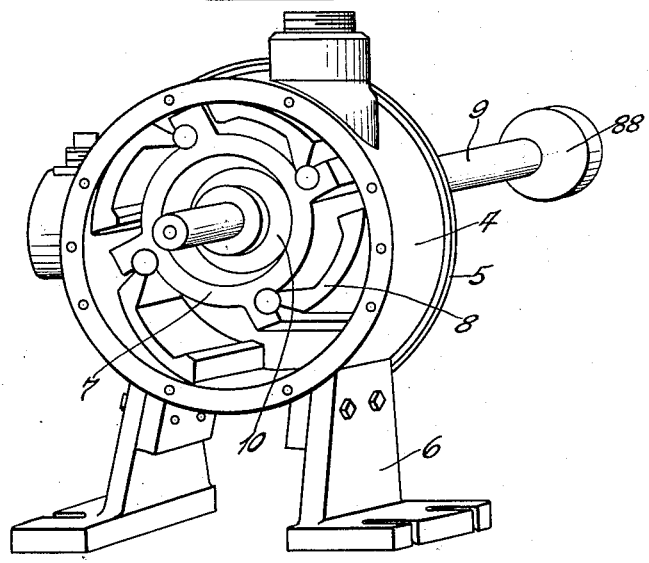
Fig. 13 is an isometric view in the form of blowers or air pump.

In the embodiment of the invention illustrated in the drawings the apparatus is shown as including an air tank 1 carried by a support 2 in which tank a pressure is generated and maintained. The pressure is generated by a pump or blower 3 of any suitable construction. The type of pump or blower illustrated in the drawing is shown in detail in Fig. 13 of the drawing. This pump is of the rotary type and comprises a cylinder 4 having heads 5, the cylinder being supported by legs or standards 6. Within the cylinder is a rotating piston 7 having a plurality of wings 8 hinged thereto. The piston is driven from a drive shaft 9 and which is operatively connected with the piston through a cam 10. The pump is lubricated and sealed by means of oil drawn into the pump through a pipe 11 from an excess supply thereof contained in a well 12 at the bottom of a housing 13 in which the pump is mounted.

The details of construction of the pump are not part of the present invention, but are illustrated and described for the purpose of clearness in the description of a combination in which the pump functions as one element.

The pump is driven by a motor 14 connected with the shaft 9 by a flexible coupling 15. The pressure developed by the pump, when the motor operates, is delivered through a pipe 16 which enters an oil separator 17. The oil separator is shown in detail in Fig. 10 of the drawings. It comprises a cylinder 18 having a bottom wall 19 and a top cover 20. The pipe 16 is connected into a threaded boss in the cover 20. An air exit pipe 21 connects into a threaded boss in the cover 20 and serves to deliver the air to the air tank 1 after the oil has been separated from the air. Connected with the cover and extending downwardly into the chamber formed by the cylinder 18 is a transverse rib 22 which is disposed between the air inlet and outlet and serves as a baffle against which the inflowing current of air impinges, causing a gravity separation of the oil from the air, the oil accumulating in the bottom of the cylinder 18 and the air passing into the pipe 21. Within the cylinder 18 is a float 23 provided with an upwardly extending stem 24 and a downwardly extending stem 25 in axial alinement therewith. The upper end of the stem 24 operates in a recess formed in the boss 26 disposed axially of the rib 22. This construction provides a guide for guiding the movement of the float in the cylinder. The lower extremity of the stem 25 is tapered to form a valve needle 27 that operates to open and close an oil outlet passage 28 in a valve member 29, there being a valve seat at the upper end of the passage 28 that operates with the needle valve 27. An oil outlet pipe 30 connects with the lower end of the passage 28 for delivering oil from the oil separator when the oil level in the cylinder reaches a predetermined height sufficient to raise the valve 27 from the seat. The purpose of providing a body of oil in the lower part of the cylinder is to seal the upper part of the chamber formed by the cylinder 18 and to prevent the escape of air pressure. The oil passing from the oil separator through the pipe 30 is a part of an oiling system which is the subject matter of a separate application but, for the purpose of completeness of the present description, may be briefly described as including a header 31 in which the pipe 30 discharges. Connected into the header 31 are a series of oil distributing pipes designated by the numeral 32. The pipes are connected in such a manner as to lubricate the bearings of the motor, the air pump and the fuel pump. The overflow is carried back to the well 12 through a pipe 33.

The pressure in the tank 1 is automatically controlled by a mercury pressure switch 34 illustrated in detail in Fig. 9 of the drawings. This switch includes a pressure chamber 35 which is in communication with the tank 1 through a pipe 36. At the head of the pressure chamber 35 is a diaphragm 37 having connected therewith a stem 38 pivoted to a bell crank lever 39 which in turn is connected with a pivoted mercury switch 40 through a link 41.

The assembly and construction of the switch 34 is such that when a predetermined pressure is reached in the tank 1 the pressure on the diaphragm 37 throws the switch to open the circuit, and when the pressure drops below the predetermined degree the switch is closed to energize the motor.

Figure 6:
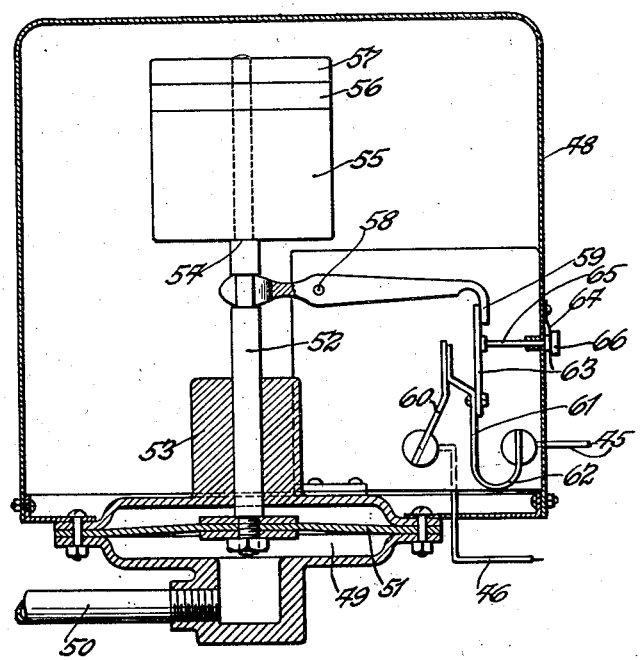
Fig. 6 is a detailed view, in vertical section, of the pressure operated safety cutout.

The motor circuit includes line leads 42 and 43. The lead 42 is connected with one terminal of the motor by a service lead 44. The lead 43 is connected with one terminal of a safety cutout by a lead 45. A lead 46 connects one terminal of the switch 34 with the other terminal of the safety cutout. A lead 47 connects the other terminal of the switch 34 and the motor terminal. The wiring places the switch 34 in series with the safety cutout hereinafter described. The safety cutout 48 is shown in detail in Fig. 6 of the drawings, the construction of which is the subject matter of a separate application.

The safety cutout includes a pressure chamber 49 that is in communication with an extension 50 of the pipe 36. Within the chamber 49 is a diaphragm 51 that carries a stem 52 supported for longitudinal movement in an axial opening in the boss 53 carried by the upper wall of the pressure chamber 49.

The upper end of the stem 52 is reduced to form a shoulder 54 that constitutes a support for disc weights 55, 56 and 57, which have openings therein so that they may be mounted over the reduced extremity of the stem 52. Thus a variable counter weight may be imposed against the upper face of the diaphragm 51 to set the cutout for operation at a predetermined pressure delivered to the pressure chamber against the lower face of the diaphragm 51. When the pressure against the lower face of the diaphragm 51 is less than the pressure for which the device is set, the counter weight will depress the stem 52, and when the pressure in the chamber 49 exceeds the weight imposed against the opposite face of the diaphragm the stem will be raised.

The longitudinal movement of the stem 52 operates a pivoted lever 58, one arm of which is operatively connected with the stem 52 and the other end of which forms a detent 59 for the circuit breaker.

The circuit breaker comprises a leaf conductor 60 connected with one terminal of the cutout and a leaf conductor 61 connected with the other terminal of the cutout.

The member 61 is formed with a bowed section 62 that constitutes a spring normally tending to move the extremities of the leaves 60 and 61 out of contact. Connected to the member 61 is a plate 63 of insulating material which extends upwardly and is engaged by the detent 59 when the free arm of the lever 58 is depressed to hold the extremities of the leaves 60 and 61 in contact and complete the electrical circuit across its terminals.

When the pressure in the pressure chamber 49 is reduced below the predetermined setting of the device, the stem 52 moves downwardly and raises the detent 59 out of contact with the member 63, causing the circuit to open. This outward movement of the leaf 61 results from the construction of the bowed section thereof and by the tendency of the spring 64 to move outwardly the stem 65 connected with the member 63. The stem 65 is provided with a finger piece 66 for manually moving the leaf 61 inwardly to contact position with the leaf 60. Thus, after the pressure has once dropped below the predetermined limit, the circuit to the motor cannot be established until the stem 65 is moved inwardly manually and held in that position during the interval that the pressure is building up in the pressure chamber 49 below the diaphragm 51. When the pressure develops to a sufficient degree in the chamber 49 against the lower face of the diaphragm 51 to raise the stem 52, the detent 59 again engages the member 63 and holds the circuit closed, through the safety cutout, until there has been another reduction of pressure in the chamber 49.

The purpose of the safety cutout is to prevent the operation of the motor and, thereby, delivery of air pressure from the tank 1 to the carburetor when the pressure in the tank 1 falls below that sufficient to operate the devices supplied with gas. Thus, if the power for the motor is temporarily discontinued and pressure in the system falls below normal, the safety cutout will operate to open the motor circuit, and thereby discontinue generation of gas until the safety cutout is manually reset. This is an important safety feature. If the pressure in the tank 1 falls below the normal gas generating pressure and gas is withdrawn from the system of a pressure insufficient to ignite, there would be an escape of free gas at the delivery point. The safety cutout is one of the important elements of the combination of elements comprising the present invention, although it should be understood that the specific construction of the safety cutout is not a part of this invention.

Figure 7:
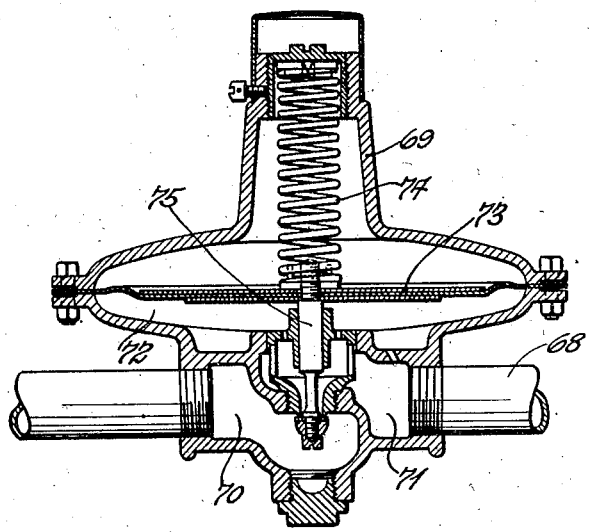
Fig. 7 is a detailed view, in vertical section, of the pressure regulating valve between the air supply tank and the carburetor.

The regulated air pressure from the tank 1 is delivered to the carburetor 67 by a pipe 68 in which there is interposed a pressure reducing valve 69 having its high pressure side in communication with the air tank and its low pressure side in connection with the carburetor. The pressure reducing valve is shown in detail in Fig. 7 of the drawings, although it should be understood that the construction there shown is not specifically a part of the present invention and that other known forms of pressure reducing valves may be substituted, if desired. As illustrated, the pressure reducing valve comprises an inlet chamber 70 and an outlet chamber 71. The outlet chamber 71 is in communication with a pressure chamber 72 in which a diaphragm 73 is mounted. A spring 74 operates against the upper face of the diaphragm 73 and is set for the delivery pressure from the valve. The outlet chamber from the valve, being in communication with the lower face of the diaphragm 73, tends to hold the diaphragm in position to prevent communication between the chambers 70 and 71 so long as the pressure in the outlet chamber is high enough to counter the tendency of the spring 74. When the pressure in the outlet chamber falls below the predetermined setting of the valve, the spring 74 moves the diaphragm 73 downwardly, which operates the valve member 75 to open communication between the chambers 70 and 71 admitting additional pressure sufficient to maintain the delivery pressure from the device at the predetermined point for which the valve is set. Therefore, it is obvious that a regulated pressure is delivered to the carburetor through the pipe 68.

The fuel supply device for the carburetor comprises a pump 76 which is actuated by the shaft that drives the pump 3. The pump construction is shown in detail in Fig. 8 of the drawings, but the details of the construction thereof are not part of the present invention. A brief description of the function of the pump will lend clearness to the description of the apparatus.

The pump receives a supply through the pipe 77 from a storage tank 78, the pipe 77 entering the tank and having its opening near the bottom thereof. The fuel supply enters a chamber 79 which communicates through the passage 80 with the pump chamber 81. The communication between the chamber 79 and the passage 80 is controlled by an outwardly opening valve 82.

In the chamber 81 is a spring operated diaphragm 83, the spring normally actuating the diaphragm to raised position. The diaphragm 83 has a downwardly extending stem 84 connected to a bell crank lever 85 by toggle links 86. The bell crank lever 85 operates in opposition to a spring 87 bearing against the inner arm of the lever. A cam 88 on the shaft 9 is in contact with the free end of the bell crank lever 85, the lever being rocked upon the rotation of the shaft 9 by the cam. As the bell crank lever 85 is moved inwardly the end connected with the toggle links is depressed, drawing the diaphragm 83 downwardly and, by suction, the fuel supply is carried from the chamber 79 into the chamber 81 on said down stroke. When the free end of the bell crank lever 85 rides on the lower side of the cam 88, the diaphragm spring forces the diaphragm upwardly and expels the contents of the chamber 81 through a valve 89 into a supply pipe 90 leading to the upper part of the carburetor. A needle valve 91 is interposed in said pipe 90 to regulate the flow of fuel through the supply pipe. The supply pipe extends into the carburetor chamber and discharges downwardly from a spreader 92 shown in detail in Fig. 3.

The internal construction of the carburetor comprises a series of trays, one of which is illustrated in detail in Fig. 4. Each tray comprises a pair of interfitting rings 93 between which is stretched a fabric wall 94, a section of which is cut out to form a segmented opening 95 at one side. A plurality of trays thus constructed is formed in a vertical series with the opening 95 in each alternate tray preferably disposed diametrically opposite each other to form a tortuous air passage, as indicated by the arrows in Fig. 2. The tray stack is supported at the bottom by a frame comprising cross members 96 and vertical legs 97, thereby forming an air receiving chamber at the bottom of the carburetor shell. It will be noted that the trays do not extend entirely to the top of the shell, thus forming a vapor chamber at the top of the carburetor shell, the gas being generated by the air passing upwardly through the carburetor and the fuel passing downwardly, by gravity, through the fabric wall of the stack of trays. Any excess fuel that is not vaporized by the air passing upwardly through the carburetor accumulates in the bottom of the carburetor shell and is returned to the storage tank through a valve controlled outlet 98 that enters a trap shown in detail in Fig. 12.

The trap comprises a closed cylindrical shell 99, a cover 100 and a float operated valve which includes the float 101, the guide stem 102 operating in a hollow boss 103, and a downwardly extending stem 104. The stem 104 is tapered at its lower end to form a needle valve 105 that controls an outlet port 106 through the bottom of the float. The port 106 connects with a return pipe 107 that enters the supply tank 78. This trap forms a seal, by the accumulation of the liquid in the bottom thereof, to prevent the escape of pressure from the carburetor. Said trap periodically discharges into the supply tank when the liquid level in the bottom of the trap raises the valve 105 from its seat.

Figure 14:
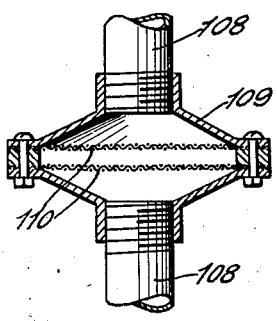
Fig. 14 is a detailed view of a safety device in the gas delivery line.

The gas generated in the carburetor is withdrawn from the dome thereof through a service conduit 108 that leads to any point of use. A safety device is connected into the pipe 108 and is shown in detail in Fig. 14. Said safety device comprises a chamber 109 having spaced reticulated walls 110 therein. The safety device prevents back fire into the carburetor which might otherwise occur from the burners connected to the service pipe 108.

In operation, when a supply of gas is withdrawn from the service pipe 108, the pressure in the pressure regulating valve 69 is reduced, thus causing withdrawal of air from the air tank and, in turn, reducing the pressure therein. When the pressure has reduced below the setting of the switch 34, the motor circuit is energized and the air pump 3 operates, and on incident therewith, the fuel pump operates and delivers fuel through the needle valve 91 in proportion to the amount of air supplied from the pressure reducing valve to the carburetor. If, for any reason, the air supply in the tank 1 falls below the predetermined setting of the safety cutout 48, the motor circuit will be opened and will remain open until reset manually and the pressure is built up by operation of the air pump to the required minimum. The air and fuel supply is definitely coordinated and is supplied only when pressure in the tank 1 reduces below the predetermined pressure for which the switch 34 is adjusted.

When there is withdrawal of gas from the service conduit 108 the coordinated volumes of air and fuel are automatically supplied to generate the required gas pressure in the carburetor. Therefore, the device is positive in its action, can be accurately controlled and is safe in its operation.

I am aware that the construction may be modified in numerous particulars without departing from the spirit and scope thereof. I do not limit myself, therefore, to the exact construction herein described, but what I claim and desire to secure by Letters Patent is:—

1. In a gas generating apparatus the combination of a carburetor, with an air supply tank, a pipe for conducting air from the air supply tank to the carburetor, a device in said pipe for maintaining a regulated supply of pressure to the carburetor, a fuel pump for supplying fuel to the carburetor, an air pump for maintaining pressure in said supply tank, a motor for simultaneously operating said fuel pump and said air pump, and an automatic switch operable in response to pressure in the air tank for controlling the operation of the motor.

2. In a gas generating apparatus the combination of a carburetor, with an air supply tank, a pipe for conducting air from the air supply tank to the carburetor, a device in said pipe for maintaining a regulated supply of pressure to the carburetor, a fuel pump for supplying fuel to the carburetor, an air pump for maintaining pressure in said supply tank, a motor for simultaneously operating said fuel pump and said air pump, an automatic switch operable in response to pressure in the air tank for controlling the operation of the motor, and a cutout device operating to open the motor circuit when the pressure in the air tank falls below a predetermined minimum.

3. In a gas generating apparatus the combination of a carburetor, with an air supply tank, connections between the air supply tank and carburetor for maintaining a regulated supply of pressure to the carburetor, a fuel pump for supplying fuel to the carburetor, an air pump for maintaining pressure in said air supply tank, a motor for simultaneously operating said fuel pump and said air pump, an automatic switch operable in response to pressure in the air tank for controlling the operation of the motor, a cutout device operating to open the motor circuit when the pressure in the air tank falls below a predetermined minimum, and means for resetting said cutout device manually to close the motor circuit.

4. In a gas generating apparatus the combination of a carburetor, with a pipe for supplying air to the carburetor, a device in connection with said pipe under control of the pressure in the carburetor regulating the passage of air to the carburetor, means for supplying fuel to the carburetor in metered quantities coordinated with the air supply, a motor for operating the air and fuel supply, and an automatic switch operable in response to the pressure of the air supply for controlling operation of the motor.

5. In a gas generating apparatus the combination of a carburetor, with an air supply tank, a pipe for conducting air from said tank to said carburetor, a valve in said pipe operated to closed position by the pressure of air in the carburetor, an air pump for supplying pressure to said air tank, an oil separator between the air pump and the air tank operating as a seal for the air pressure and for separating the oil from the air stream before it enters the tank, a fuel pump for supplying fuel to the carburetor, a motor, a common drive shaft for driving the air pump and the fuel pump, an automatic switch operable in response to the pressure in the air tank for controlling the operation of the motor, and a cutout device in the motor circuit to open the circuit when the pressure in the air tank drops below a predetermined minimum.

6. In a gas generating apparatus the combination of a carburetor, with an air supply tank, an air pump for supplying pressure to said air tank, an oil separator between the air pump and the air tank operating as a seal for the air pressure and for separating the oil from the air stream before it enters the tank, a fuel pump for supplying fuel to the carburetor, a motor, a common drive shaft for driving the air pump and the fuel pump, an automatic switch for controlling the operation of the motor, a cutout device in the motor circuit to open the circuit when the pressure in the air tank drops below a predetermined minimum, and a manually settable device for closing the circuit through said cutout.

7. In a gas generating apparatus the combination of a carburetor, with an air supply tank, a pipe for conducting air from said tank to said carburetor, a valve in said pipe operated to closed position by the pressure of air in the carburetor, an air pump for supplying pressure to said air tank, an oil separator between the air pump and the air tank operating as a seal for the air pressure and for separating the oil from the air stream before it enters the tank, a fuel pump for supplying fuel to the carburetor, a motor, a common drive shaft for driving the air pump and the fuel pump, and an automatic switch operable in response to the pressure in the air tank for controlling the operation of the motor.

8. In a gas generating apparatus the combination of a carburetor, with an air supply pipe for said carburetor, a pipe for conducting air from said tank to said carburetor, a valve in said pipe operated to closed position by the pressure of air in the carburetor, a fuel tank, connection between the fuel tank and the carburetor, a pump interposed in said connection, a motor for operating said pump to deliver metered quantities of fuel to the carburetor, an overflow trap connected with the carburetor providing a discharge for accumulated fuel in the carburetor, and a return passage from the trap to the fuel supply tank.

JOHN H. CORDES.